(12) United States Patent
Srivastava et al.

(10) Patent No.: US 8,904,485 B2
(45) Date of Patent: *Dec. 2, 2014

(54) SYSTEM AND METHOD FOR INTERMEDIATING BETWEEN SUBSCRIBER DEVICES AND COMMUNICATION SERVICE PROVIDERS

(71) Applicant: Synchronoss Technologies, Inc., Bridgewater, NJ (US)

(72) Inventors: Shallesh Srivastava, Bangalow (IN); Narendra Babu Rajagopal, Bethlehem, PA (US); Gautam Santra, Bethlehem, PA (US); Chandrasekaran Venkatasubbiaia, Bethlehem, PA (US)

(73) Assignee: Synchronoss Technologies, Inc., Bridgewater, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/253,207

(22) Filed: Apr. 15, 2014

(65) Prior Publication Data

US 2014/0237099 A1    Aug. 21, 2014

Related U.S. Application Data

(63) Continuation of application No. 12/758,138, filed on Apr. 12, 2010, now Pat. No. 8,739,246.

(51) Int. Cl.
| | |
|---|---|
| *G06F 7/04* | (2006.01) |
| *H04L 12/24* | (2006.01) |
| *H04L 29/08* | (2006.01) |

(52) U.S. Cl.
CPC .............. *H04L 41/50* (2013.01); *H04L 67/16* (2013.01); *H04L 67/2823* (2013.01)
USPC .............................................................. 726/3

(58) Field of Classification Search
CPC .......... H04L 63/08; H04L 63/10; H04L 63/20
USPC .............................................................. 726/3
See application file for complete search history.

(56) References Cited

U.S. PATENT DOCUMENTS

| | | | |
|---|---|---|---|
| 5,915,214 A | 6/1999 | Reece et al. | |
| 7,477,731 B2 | 1/2009 | Tamari et al. | |
| 2002/0156932 A1* | 10/2002 | Schneiderman | 709/317 |
| 2002/0169858 A1* | 11/2002 | Bellinger et al. | 709/220 |
| 2004/0185833 A1 | 9/2004 | Walden et al. | |
| 2004/0242209 A1* | 12/2004 | Kruis et al. | 455/414.1 |

(Continued)

OTHER PUBLICATIONS

Officer: Blaine R. Copenheaver, "Related International Patent Application No. PCT/US2011/031382", "International Search Report and Written Opinion", Jun. 20, 2011, Publisher: PCT, Published in: US.

(Continued)

*Primary Examiner* — Teshome Hailu
(74) *Attorney, Agent, or Firm* — Kaplan Breyer Schwarz & Ottesen, LLP

(57) ABSTRACT

A system and method are disclosed which may include receiving an activation request from a first subscriber device at a communication convergence platform; identifying a service provider associated the first subscriber device; composing a service activation request compatible with a communication protocol for the identified service provider; and transmitting the service activation request from the platform to the identified service provider.

15 Claims, 6 Drawing Sheets

(56) References Cited

U.S. PATENT DOCUMENTS

| | | |
|---|---|---|
| 2006/0258341 A1 | 11/2006 | Miller et al. |
| 2008/0022103 A1* | 1/2008 | Brown et al. ............ 713/175 |
| 2008/0072314 A1 | 3/2008 | Frenette |
| 2008/0201266 A1 | 8/2008 | Chua et al. |
| 2009/0328181 A1 | 12/2009 | Ye et al. |

OTHER PUBLICATIONS

Nora Lindner, "Related International Application No. PCT/US2011/031382", "International Preliminary Report on Patentability", Oct. 26, 2012, Publisher: PCT, Published in: CH.

"Related EP Patent Application No. 11 76 9320", "Supplemental European Search Report", Oct. 10, 2013, Publisher: EPO, Published in: EP.

"Related U.S. Appl. No. 12/758,138", "Office Action", Oct. 30, 2013.

"Related U.S. Appl. No. 12/758,138", "Notice of Allowability", Jan. 8, 2014.

"Related U.S. Appl. No. 12/758,138", "Office Action", Jul. 5, 2012.

"Related U.S. Appl. No. 12/758,138", "Office Action", Nov. 9, 2012.

"Related U.S. Appl. No. 12/758,138", "Office Action", Jun. 11, 2013.

"Related U.S. Appl. No. 12/758,138", "Office Action", Oct. 24, 2013.

* cited by examiner

SYSTEM AND METHOD FOR INTERMEDIATING BETWEEN SUBSCRIBER DEVICES AND COMMUNICATION SERVICE PROVIDERS

CROSS-REFERENCE TO RELATED APPLICATION(S)

This application is a Continuation of USPTO Ser. No. 12/758,138, with a U.S. filing date of Apr. 12, 2010, which is incorporated herein by reference.

BACKGROUND OF THE INVENTION

Various types of digital devices including communication devices require activation using a dedicated server for the subject device to become operational. Wireless devices figure prominently among the devices requiring various forms of activation using computer server equipment.

The emerging device market is expected to grow significantly in near future. As wireless market penetration increases across the world, the availability of new devices provides the opportunity for all markets to grow at more accelerated rates. For emerging markets, this will help drive even faster adoption of wireless services as entire lines of new wireless-communication enabled devices, from laptops to cameras, become available. For more mature markets, defined as those markets that will reach 100% wireless-voice-service saturation by about 2015, the emerging devices market is expected to experience continued strong growth.

Smart phones and mobile navigation industry devices are among the devices experiencing rapid growth. Growth in sales of smart phones as well as the emergence of vendor-driven application stores and marketplaces, are changing the dynamics of the mobile communication industry. In the navigation space, the integration of GPS into smart phones has accelerated. As more and more consumer (mass market) electronic devices are developed, they will become more mobile, and the transmission and receipt of information will become prominent features for the marketing of such devices.

Some emerging product features include cameras with SIM cards, and the ability to download electronic books vie e-Book readers. Even household appliances, like refrigerators and hot water heaters, are becoming wireless-enabled. The communication industry is experiencing a period of major advances in device and user interface design, which will lead to rapid changes in mobile user behavior and the services consumers demand when on the move resulting in an increased need for automated activation applications.

The product growth discussed above will drive significant device activation request volume in the coming years. Initially, notebook computers with wireless cards and Smart phones are likely to dominate among new wireless devices. However, later on, the adoption of more advanced consumer electronic wireless devices with embedded connectivity, telematics, and devices combining computing capabilities, telephone connectivity, and gaming will become more prevalent and drive even stronger growth as the industry progresses.

The above-discussed growth in wireless connectivity will require a correspondingly large amount of activation and device management capacity. However, existing approaches to activating new mobile devices impose significant obstacles to efficiently and rapidly activating new devices. First, existing activation procedures are complex and time consuming, thereby imposing significant inconvenience and expenditure of time in activating new devices. Second, currently, activation and registration of new devices is usually conducted at retail outlets by service personnel affiliated with a particular communications service provider. The above approaches pose obstacles to efficiently integrating the ever expanding array of mobile devices into wireless communication networks. Accordingly, there is a need in the art for improved systems and methods for activating and managing new mobile devices.

SUMMARY OF THE INVENTION

According to one aspect, the present invention is directed to a method that may include receiving an activation request from a first subscriber device at a communication convergence platform; identifying a service provider associated the first subscriber device; composing a service activation request compatible with a communication protocol for the identified service provider; and transmitting said service activation request from the platform to the identified service provider.

Other aspects, features, advantages, etc. will become apparent to one skilled in the art when the description of the preferred embodiments of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PREFERRED EMBODIMENTS

Figure 1:
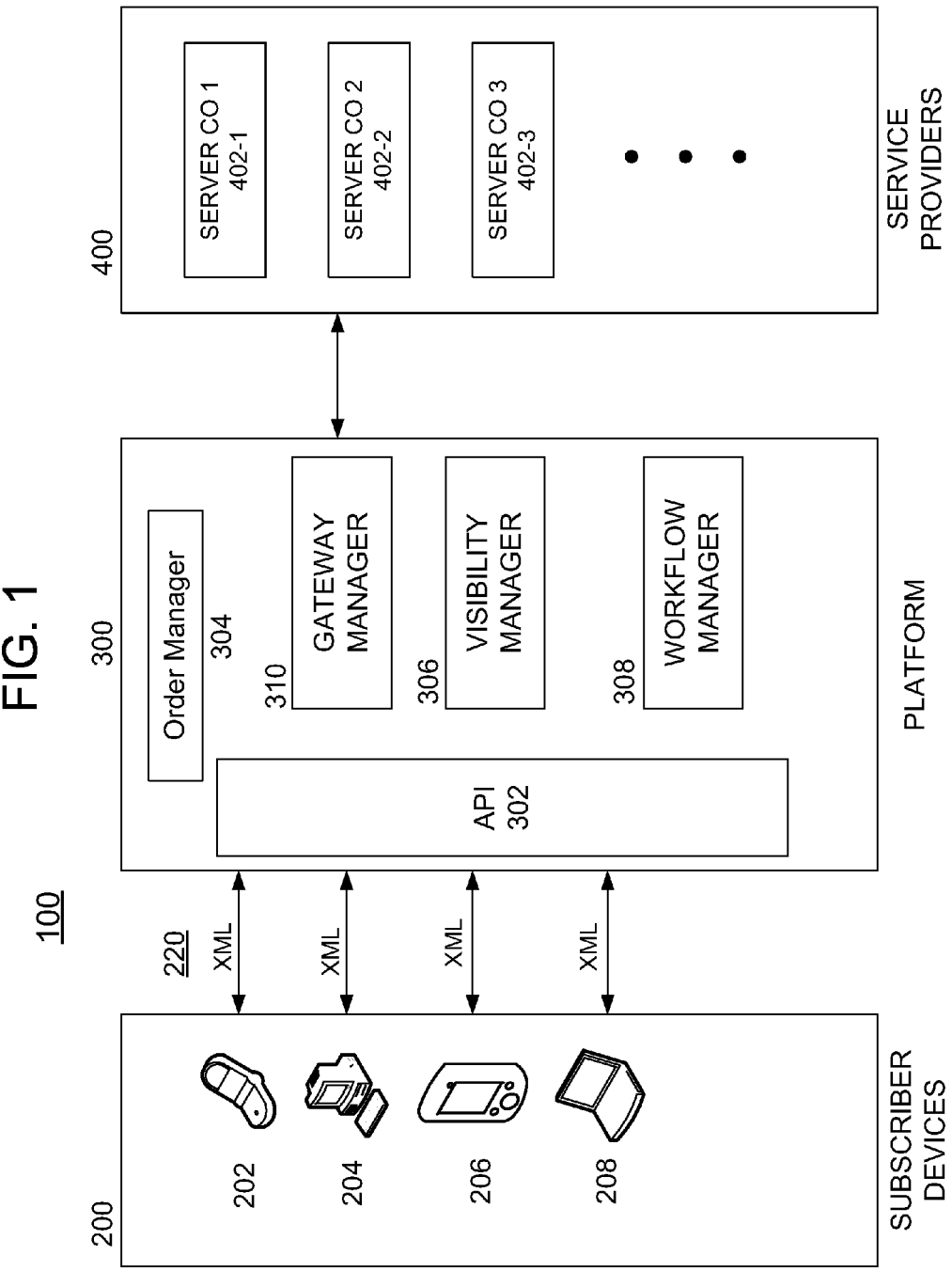
FIG. 1 is a block diagram of a communication system including a communication platform in accordance with an embodiment of the present invention.

In the following description, for purposes of explanation, specific numbers, materials and configurations are set forth in order to provide a thorough understanding of the invention. It will be apparent, however, to one having ordinary skill in the art that the invention may be practiced without these specific details. In some instances, well-known features may be omitted or simplified so as not to obscure the present invention. Furthermore, reference in the specification to phrases such as "one embodiment" or "an embodiment" means that a particular feature, structure or characteristic described in connection with the embodiment is included in at least one embodiment of the invention. The appearances of phrases such as "in one embodiment" or "in an embodiment" in various places in the specification do not necessarily all refer to the same embodiment.

Introduction

An embodiment of the system and method disclosed herein includes a communication platform that provides comprehensive on-demand, end-to-end order processing, transaction management, and subscriber management for Emerging Devices. Embodiments of the communication platform disclosed herein offer all of the features of a basic communication platform and add the features of automated connections beneficial for enabling the activation and management of various types of emerging wireless-enabled devices. In addition, an embodiment of the communication platform is specifically designed to support embedded communication devices, such as smart phones, mobile internet devices, laptops, and wirelessly enabled consumer electronics such as cameras and global positioning system devices.

More specifically, the platform can support a customer experience that operates from the subscriber end of a transaction to the Communication Service Provider (CSP) end of the transaction with minimal to non-existent intervention by any person other than the owner of the subscriber device. The above is referred to herein as an end-to-end experience. The system and method disclosed herein also provides support for transactions in addition to device activation such as but not limited to: device management, credit card billing, device insurance, the ability to provide instant prequalification transactions, recurring credit card billing, and/or automated service fulfillment.

An embodiment of the communication platform offers the following basic functionality involved in accepting an electronic message from a device, kiosk, web site or enterprise application and performing all the necessary tasks associated with ensuring that every device and/or service is activated and ready for use by the end user of the device. The system and method herein preferably also ensure that selected features of communication platform are properly set up within CSP back-office systems.

In addition to the activation process, the communication platform establishes automated connections between various servers as needed based on information requirements, to enable checking for service eligibility and/or credit checking. The platform may also provide a dynamic product catalog to match selected offers to appropriate consumers during the activation and account setup procedures.

An embodiment of the platform may also be linked directly into the operating systems of the emerging device providers. This process is essentially a "Grab-and-Go" activation process. An embodiment of the platform may include a next-generation extension to its core platform that will enable activation functionality in addition to the operating systems of the devices and link them to the platform.

Extending the reach of the communication platform into the actual operating system level of the subscriber devices will preferably enable devices, once turned on or "opened up," to enable the user of the device to easily use a "Grab-and-Go Activation Process" at the operating-system level. The foregoing process may be facilitated by adding the feature of a software wizard to guide a user of the subscriber device through an activation process.

Employing the system discussed above, manufacturers of subscriber devices may become able to provide consumers who purchase the devices with an automated pre-qualification, an automated credit check, and/or a choice of CSP. This approach is helpful in providing a subsidized device offering. Once the consumer has selected a preferred CSP, customers, through the platform, can activate and manage the subscriber device in real time, on an ongoing basis. This approach will also enable end users of the devices to become acquainted with the service and brand name of the entity responsible for the functionality of the platform and the associated "wizard". It is expected that the public recognition of the entity providing the platform and wizard will expand that consumers will become familiar with the "grab-and-go" activation process as consumers have done in the past with the Apple Iphone® process.

The expanded functionality may be embodied within an Application Programming Interface (API) that is easy to use and that allows subscribers to activate services and devices using methods that are preferably independent of the network the subscriber devices will operate on or the type of service being requested. Accordingly, an embodiment of the platform disclosed herein is intended to serve as a single sthece for all-encompassing subscriber device management which may include the operations listed below:

1. Order Management;
2. Product Catalog capabilities;
3. Eligibility;
4. Account Management;
5. Credit Card Payment & Billing;
6. Supply Chain Distribution; and
7. Activation/Provisioning.

An embodiment of the platform may also be supported with fallout capabilities that, with the aid of manual support staff, can quickly resolve problems with subscriber transactions. Herein, the term fallout generally corresponds to a self-healing capability of the communication convergence platform 300 (FIG. 1) disclosed herein. The problem handling process is supported in the workflow and is tailored to ensure accurate and quick resolution. A preferred embodiment of the fallout management system and method is characterized by the following attributes:

1. Specific bases are established whereby problems may be resolved (a) by using automated methods, or (b) by directing "buckets" of fallout data to selected data queues to await human intervention by trained debugging specialists;

2. The system may establish access restrictions that only allow trained, qualified specialists to access the applicable data "buckets";

3. The deployment of automatic email and electronic messaging preferably operates to quickly provide status information and reports on problems to subscribers and provide the ability to accept corrected information online for rebooting the system in the event of a breakdown;

4. Administrative tools allow the platform to provide specific configurations around Service Level Agreements (SLAs) for each device type as well as dynamic work capabilities to modify workflow as required.

5. The system may be provide an interactive Voice Response (IVR) platform that enables subscribers to check the status of one or more transactions and/or make simple move, add, or change requests.

An embodiment of the platform disclosed herein is supported by end-to-end, real time reporting that provides complete, real-time visibility into the subscriber management process for emerging-device and CSP customers. The system preferably also provides both inbound and outbound automated calling capabilities, if needed, with an automated IVR platform that can be readily configured to improve the subscriber management process and reduce costs. The standard offer and associated pricing excludes manual calls. These calls can be supported and will be priced on a per-minute basis.

The Payment Card Industry (PCI) Data Security Standard (DSS) is a set of comprehensive requirements for enhancing payment account data security. The standard was developed by the founding payment brands of the PCI Security Standards Council, including American Express, Discover Financial Services, JCB International, MasterCard Worldwide and Visa Inc. International, to help facilitate the broad adoption of consistent data security measures on a global basis. The PCI DSS is a multifaceted security standard that includes requirements for security management, policies, procedures, network architecture, software design and other critical protective measures. This comprehensive standard is intended to help organizations proactively protect customer account data. An embodiment of the platform will conform with the PCI standards. In this manner, the platform disclosed herein may add to the functions of communication connectivity that is independent of device type, OS type, and server type with the ability to enable purchases, money transfers, and other financial transactions, as needed by users of the subscriber devices.

FIG. 1 is a block diagram of a communication system 100 including a communication platform 200 in accordance with an embodiment of the present invention. Communication system 100 may include subscriber devices 200, communication platform 300, and CPSs 400. Subscriber devices 200 may include cell phones 202, desktop computers 204, portable web-enabled devices 204 (such as, for instance Personal Digital Assistants (PDAs)) 206, laptop computers 208, and/or other wireless-communication-enabled electronic devices.

Platform 300 may include Application Programming Interface (API) 302, order manager 304, visibility manager 306, workflow manager 308, and/or gateway manager 310. CSPs 400 may include any desired number of communication service providers (also referred to herein as "carriers"), including for instance, server company 1 402-1, server 2 402-2 and/or server 3 402-3. Respective devices 200 may communicate with platform 300 using XML formatted communications 220.

The benefits of the configuration of an embodiment of the platform 300 of FIG. 1 are now briefly summarized here. The interface between devices 200 and platform 300 preferably provides a common front end connection to platform 300 for the devices 200 to (a) place orders; (b) check for service availability; (c) perform credit checks; (d) bundle information; (e) initiate activation of a new device; (f) enable re-activation of a device that was for any reason disabled; and/or (g) ongoing management of the subscriber device 200.

An embodiment of the communication interface between platform 300 and service providers 400 provides (a) a single point of interface for carriers and/or service fulfillment partners (such as retailers and/or credit providers); and/or (b) a defined set of rules that carriers and partners may use to connect to one another. The interface preferably reduces the time needed to process transactions, the cost of the transactions, and the risk associated with engaging new subscriber devices and new service providers on the CSP side of the interface (the right side in the view of FIG. 1).

Figure 2:
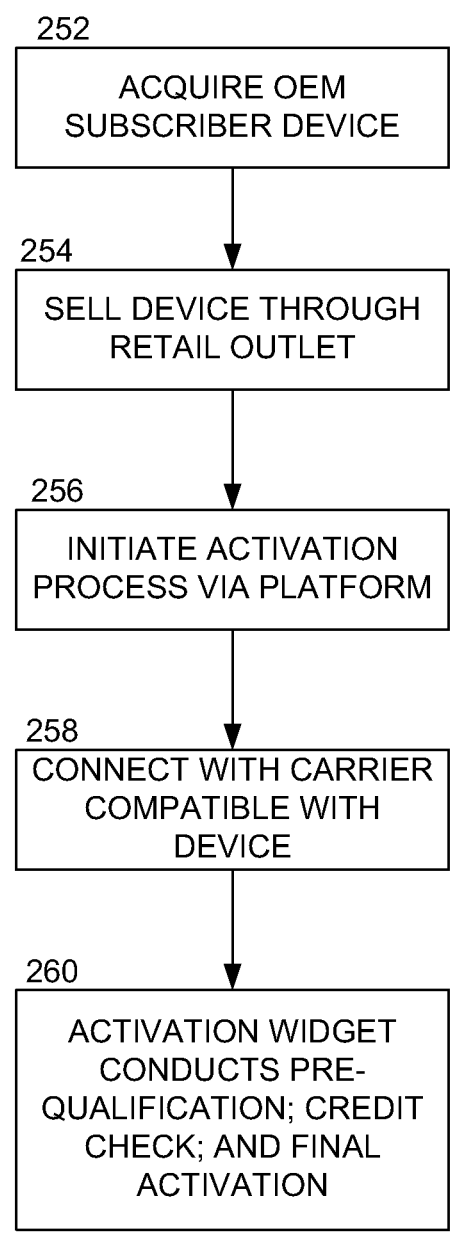
FIG. 2 is a flow diagram of a sequence of steps for activating a newly purchased subscriber device in accordance with an embodiment of the invention.

FIG. 2 is a flow diagram of a sequence 250 of steps for activating a newly purchased subscriber device in accordance with an embodiment of the invention. At step 252, a subscriber device may be obtained from an Original Equipment Maker (OEM) from a conventional retail channel 254, such as online store or brick-and-mortar store. At step 254. At step 256, a process for activating the new device may be initiated using platform 300 (FIG. 1). At step 258, platform 300 preferably connects with a communication service provider 400-*n* (FIG. 1) that will be employed for connectivity by the newly purchased device.

In this embodiment, activation software within platform 300 may proceed with several steps 260 for activating the subscriber device. Specifically, the activation software (also referred to herein as the "activation widget") may perform a pre-qualification check on the device. The activation widget may further perform a credit check on the user/owner of the device to ensure that the owner is considered to have a credit rating suitable for the CSP or other entity "advancing" communication services to the device owner, prior to the owner paying any fees for such services. If the pre-qualification check and the credit check return favorable results, the activation widget may complete and finalize the activation process.

An embodiment of platform 300 is a scalable high-performance, multi-tenant system that enables device providers to enable on-demand order processing and subscriber management services. Platform 300 preferably employs a standard set of XML-based APIs 302 that enable activation and management of services and devices independently of the network they operate on. An embodiment of platform 300 preferably includes a composite application composed of several program modules (such as modules 306, 308, 310) that are pre-integrated to provide a complete end-to-end solution. Platform 300 provides a standard workflow that orchestrates interactions with many third party systems typically involved in device activation and subscriber management. These third party systems include major communication service providers, 3PL providers, merchant banks, and common enterprise billers, thereby also facilitating the processing of retail purchasing and associated financial transactions, in addition to the activation and management of subscriber devices.

The solution is intended to be integrated easily with customer back office systems and be fed by subscriber-facing channels such as e-Commerce web sites or telesales centers. Once a request from a subscriber device 200 and associated data is captured, that information is preferably transformed into an XML message 220 and then sent to platform 300 to process transactions particular to that subscriber-facing front-end system (which may include API 302). Once a transaction (order) is received at platform 300, the transaction is preferably processed according to standard business rules that have been specifically encoded and configured to work with the CSP 402-*n* that is designated to work with the device 200 that requested the transaction. In this manner, platform 300 preferably operates as a universal communications interface between a plurality of devices 200 employing their respective operating systems and communication protocols on one side, and a plurality of CSPs 402-*n* having their respective operating systems, communication protocols, and command structures. Deploying a universal interface, such as platform 300, in this manner, beneficially removes the burden of enabling each device 200 and each CSP 400 to communicate with a plethora of different communication counterparts—an arrangement that would require extensive and redundant communication capabilities within the various devices 200 and the various CSPs 400.

The Activation Gateway (AG) 324 (FIG. 3) comprises the software core that the platform 300 is based on. The AG code base may include three distinct but complementary standard modules that enable the platform 300 experience: (1) the Gateway Manager 310; (2) the Workflow Manager 308; and (3) the Visibility Manager 306. A brief overview of the major technical components and infrastructure will follow in this document.

The Gateway Manager Module

The Gateway Manager 310 orchestrates incoming and outgoing messaging between platform 300, and integrates with customer front end order capture platforms, third party systems that provide services such as tax calculations, address validation, fraud identification, and payment processing as well as CSP OSS/BSS infrastructures. Additionally gateway manager 310 is operable to provide status updates to clients and end users via emails and/or SMS messaging to keep the customer continually informed of order status. This eliminates unnecessary subscriber calls, thereby reducing the customer order processing expense while supporting an exceptional subscriber experience. Platform 300 may provide XML schema that define the messages that platform 300 will accept or transmit. Example of the messages that pass into or out of the platform include:

Order Request: An Order Request message provides the ability to order a single product or certain combinations of the products for a new or existing customer. This request will receive a synchronous Stream Closure, and can also trigger various Order Status notifications to be sent to the URL provided in the incoming Order Request.

Order Status Request: An Order Status Request provides the ability to query for the status of an Order Request. This message type is not required to receive Order Status Notifications but provides the capability for the sender to inquire for a real-time status request should the need arise. This request will receive an Order Status Notification synchronously.

Inventory Check Request: The Inventory Check Request may be used to verify available inventory levels prior to submitting an Order Request. This information would commonly be used to inform subscribers of potential out of stock conditions, or to limit available purchase options. This request will receive an Inventory Check Response synchronously.

Coverage Check Request: The Coverage Check Request may be used to determine the carrier's service availability for a specific geographic region. This request will receive a Coverage Check Response synchronously.

Suspend Resume Request: A Suspend Resume Request message provides the ability to temporarily disable service for existing subscriber, and/or to re-enable that service. This request will receive a synchronous Stream Closure, and can also trigger many (based upon business rules) Order Status notifications to be sent to the URL provided in the incoming Suspend Resume Request.

Disconnect Request: The Disconnect Request may be used to permanently deactivate services for an existing subscriber. This request will receive a synchronous Stream Closure, and can also trigger many (based upon business rules) Order Status notifications to be sent to the URL provided in the incoming Disconnect Request.

RMA Request: An RMA Request is used to return equipment and disconnect services for an existing subscriber. This request will receive a synchronous Stream Closure, and can also trigger many (based upon business rules) Order Status notifications to be sent to the URL provided in the incoming RMA Request.

Workflow Manager

By streamlining all procurement processes from pre-order through service activation and billing account updates, workflow manager 308 preferably reduces cost and time impediments that often delay the process of delivering products and services to subscribers. Operation of workflow manager 308 may enable one or more of the following features: centralized queue management for maximum productivity; real-time visibility into transaction and revenue management; and/or automated fallout management and exception handling.

Additionally, the workflow manager 308 may include business logic for identifying how orders are managed through the platform 300. Based on order type, workflow manager 308 may apply the appropriate business validation logic. Supported validation rules include but are not limited to the following: number portability; fraud velocity; service availability; credit check; inventory check; and/or address normalization and validation; order qualification: automated vs. manual processing of CSP order types; and/or existing subscriber inquiry.

In the event a transaction needs to be processed manually because it did not pass a validation rule or was forced out of automation intentionally due to business rules, platform 300 may employ dynamic work queues to help customers manage work in a timely and orderly fashion. Dynamic work queues allow manual work to be logically segregated and worked based on exception type. Each work queue provides real time reporting in terms of the number of orders in queue, the length of time in queue and SLA compliance.

Finally, the workflow manager 308 is operable to orchestrate its activities with those of the gateway manger 310 to broker information exchange with third parties and with the CSP OSS/BSS infrastructure. Based on this exchange, the workflow manager 308 may track and apply status changes to an order as it progresses through the activation process, and also schedule future work activities against the order.

Visibility Manager Module

An embodiment of visibility manager 306 serves as the business intelligence vehicle for the platform 300. The visibility manager module 306 collects, analyzes, and presents order and system information at various points in the progress of the activation and other processes. Subscribers may use the visibility manager 306 to review real time reports or use this tool to create ad hoc reports that are needed to manage the business. One objective of visibility manager 306 is to provide the customer/subscriber with complete access to status information for each transaction/order throughout the lifecycle of the order, and provide the user with multifaceted reports that will help them make informed business decisions. This module is able to provide a wide variety of pre-defined reports. Key reports tracking activity on numerous different CSPs may be generated at predefined intervals and transmitted to the client's e-mail account, or made available in visibility manager 306 under password protection. Subscribers may also determine how they wish to consume reporting data which can be reported either through a reporting tool such as Cognos® or in a raw. CSV format.

The overall purpose of the Activation Gateway 324 is to provide a common XML interface which device manufacturers, eTailors, enterprise groups, and partners can use to order telecommunications equipment and services, as well as manage the lifecycle of a subscriber account and order. The API and system renders the differences (in communication protocol, among other features) between the various CSPs irrelevant to the subscriber devices. This provides the benefit of allowing the customers to write to a single interface that enables communication with any network (CSP) they may want to employ. All messaging sent from and to the customer systems are in a standardized form, and complex messaging and interface differences between multiple carriers are preferably abstracted away by platform 300. An example of this abstraction can be seen in the message to activate a device. A single, standardized message may be employed to activate a device on many different communication service provider networks.

Core Components

Figure 3:
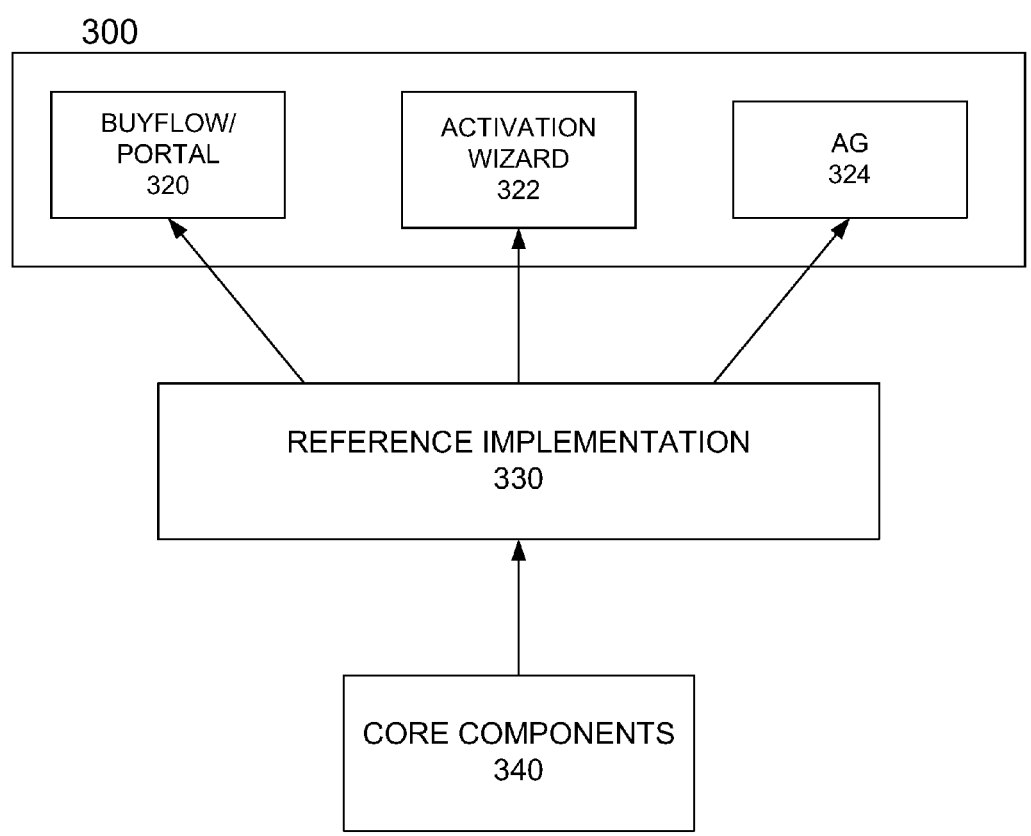
FIG. 3 is a block diagram of high level software architecture of the platform of FIG. 1.

The foundation Java interfaces, classes and database objects beneficial for implementing platform 30 constitute the Core Components 340 (FIG. 3). Core components 340 provide underlying functionality that builds upon a Java Enterprise Edition base. These components are preferably developed and maintained individually, but are tested and pre-integrated in the reference implementation. Components 340 can be used separately, or may all be deployed when a solution warrants their inclusion.

Descriptions of the major Core Components follows:

Gateway Framework: The Gateway Framework is the collection of services that works in concert with the Handler Framework to receive transaction requests from customer front-end systems.

Handler Framework: Handlers are used to receive transaction requests from customer front-end systems.

Connector Framework: Connectors are used to submit requests and responses from the external systems used to process transactions once these transactions have been received.

Workflow Framework: Workflow is configured in a series of database tables. The Workflow is used for orchestrating the automated processing of orders.

Scheduler: Used to schedule event in the Workflow.

Client Servlet Framework: The Client Servlet and related classes provide a framework for the Graphical User interface. It uses XSL to format pages to the appropriate output (XHTML/HTML).

Figure 4:
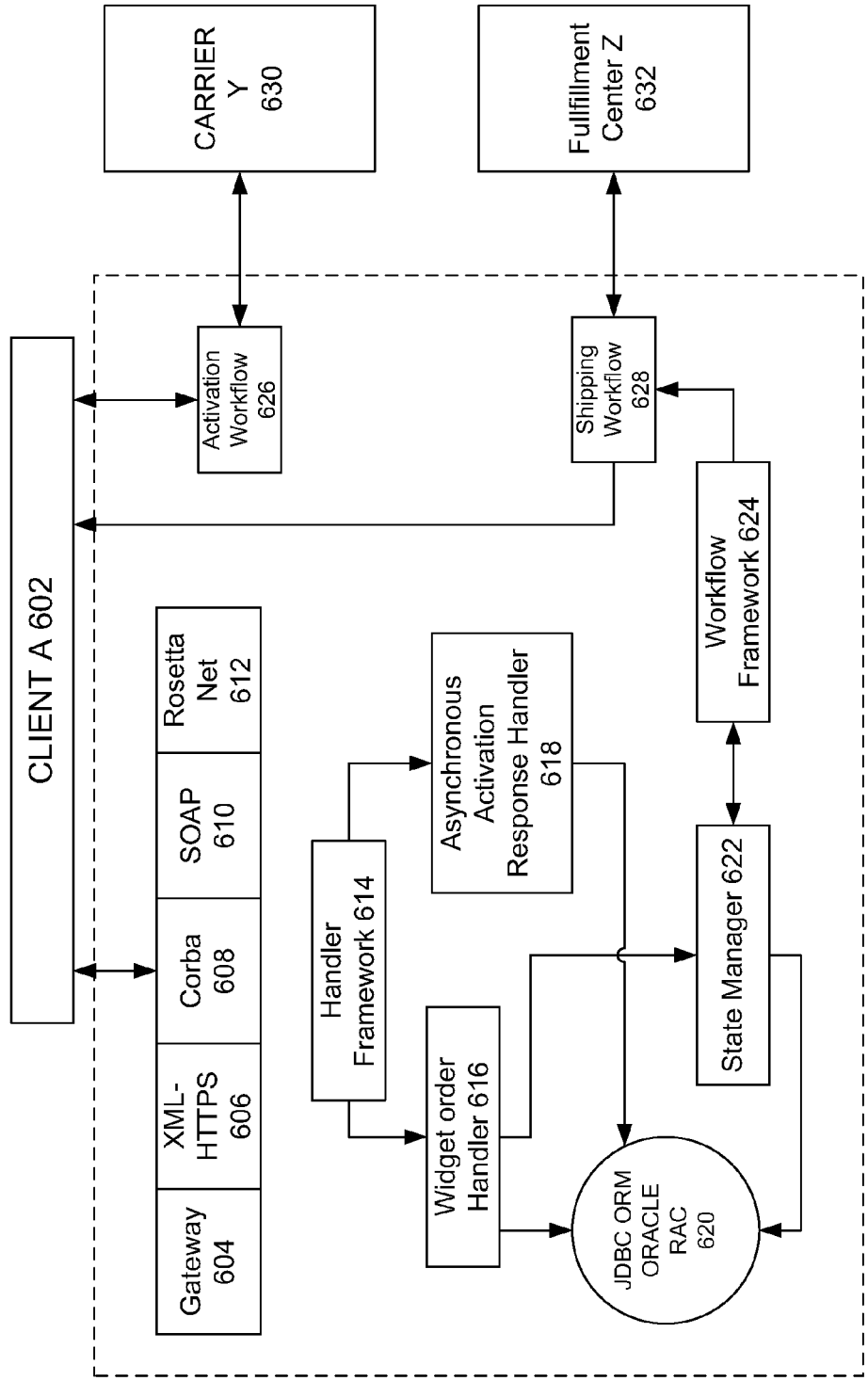
FIG. 4 is a graphical representation of the interaction of handler programs, gateway programs, and workflow programs within the platform of FIG. 1, in accordance with an embodiment of the present invention.

Dynamic Work Queue Framework: Once a transaction has been received and requires manual work by customer service representatives (CSR) and/or back office personnel, it is collected into a dynamically generated work queue where CSRs can pull orders to be manually process based on their training Gateway Framework The Gateway Framework 604 (FIG. 4) provides core libraries for handling incoming messaging in platform 300. The Gateway Framework 604 leverages standard container security (Authentication and Authorization) for API communications provided by WebLogic (or any other Java Enterprise container). The Gateway Framework 604 can be implemented to support a variety of incoming message types such as XML messages, CORBA requests 608 (FIG. 4), RMI procedure calls, web services, or any other interoperation protocol. Specifically, platform 300 (FIG. 1) may include an XML Gateway implementation and is configured to accept and transmit XML messages over HTTPS 606. RosettaNet 612 is supported as well.

Handler Framework

The Handler Framework 614 supports receiving and persisting orders received by platform 300. When a transaction is received, the handler framework 614 instantiates the correct handler for both the type of transaction and the step in the workflow, then processes the transactional data received in the incoming message.

Platform 300 can support a specific message type suitable for placing generic multi-line item orders. More generally speaking, there are at least two types of messages relating to external systems: inbound and outbound. Inbound messages are sent from the external client system to the Gateway Manager 310. The purpose of an inbound message is to ask the platform 300 to perform a certain task, such as process an order. When the XML gateway receives an inbound message it holds open the connection until the message is validated against the appropriate internal XML schema. Once the platform 300 completes its validation process and persists the message, it returns a synchronous Stream Closure message to the external client, indicating whether the incoming message was accepted. Outbound messages are sent from the platform 300 back to the external client system. The purpose of an outbound message is to notify an external client of particular events, such as a status update to an activation request that is being processed. Outbound messages are posted to the external client URL that was specified as part of the inbound message.

Connector Framework

In an automated order management environment, one of the major development efforts is building software components that can interact with external/remote systems and services. Platform 300 provides a rich library of existing connectors to major third party systems that can be leveraged by any customer. The connector framework provides a context for building reusable components to facilitate the delivery and maintainability of classes that connect the platform 300 implementation to the needed external systems and services. Fundamentally, a connector can provide a type of connection. Finally, the connector framework makes use of the workflow framework 624 for scheduling calls and retries to remote systems/services and captures both the request and response in a database table to support a variety of tracing, audit, and debugging needs. The Connector Framework is designed to support both synchronous and asynchronous conversations.

Workflow Framework

The Workflow Framework 624 provides a configurable context to orchestrate a series of steps that may be taken to complete the automated processing of transactions. The workflow is driven by the transaction's status. Developers configure the workflow by defining rows in various database tables during development cycles based on the business requirements established by business stakeholders for working and completing processing. Each time a transaction's status is updated, it is evaluated within the workflow framework against the database configuration for its disposition. The disposition of an order may be defined as being the next step in the workflow.

One of the more important concepts to understand before implementing a workflow is the fundamental design of the category and status matrix. The Categories need to represent basic steps in the business process. Each Category is then associated with a variety of distinct states that indicate what has transpired for each of those steps in the business process.

Scheduler Framework

The Scheduler Framework is a cluster-aware scheduling engine that provides a framework for invoking tasks. The Workflow Framework 624 primarily uses the Scheduler Framework to coordinate workflows, which can occur immediately based on a state value or at a specific point in time. The Scheduler Framework also supports generic housekeeping tasks and invocation of specific tasks during start up. Scheduling is accomplished by making entries in the Workflow configuration.

Dynamic Work Queue Framework

The dynamic work queue (DWQ) may be used to locate, distribute, and assign the manual processing of orders across one or more call centers. As a general rule, orders in the queues are orders that do not have a completed or cancelled status. Orders may qualify for queues based on latest status of the order or any criteria that can be expressed in an SQL query. When orders are being processed through the system, it is possible that any order could be in multiple work queues simultaneously. DWQ provides operations management the ability to manage orders and assign work. DWQ supports both the grouping of orders and the ability to pull orders to be worked based on criteria specific to the needs of the task at hand. DWQ may be used by CSRs to pull orders for processing based on individual system permissions granted to a CSR and order SLA criteria. CSR's pull the orders from a queue to push the order to the next step in the process or to its completion. Each time a representative pulls from the queue, the user locks the order. Another user will not be able to pull the same order from a queue until the order has been released. Finally, DWQ gives the capability to track how long representatives work on orders and the number and types of orders processed. DWQ's are "hot deployable," meaning that they can be changed real time, with no need to redeploy the application.

Client Servlet Framework

The Client Servlet provides a framework for the XML-driven, browser-based GUI for the platform. This is a flexible framework that supports building of complex web pages. With this arrangement, developers preferably produce and maintain only XSL style sheets, JavaScript, and generate configuration information. Documents are preferably compressed to minimize session memory and bandwidth usage. This framework preferably uses the Authentication Framework for authentication and authorization container-based security. This framework preferably includes built-in support for localization.

Figure 5:
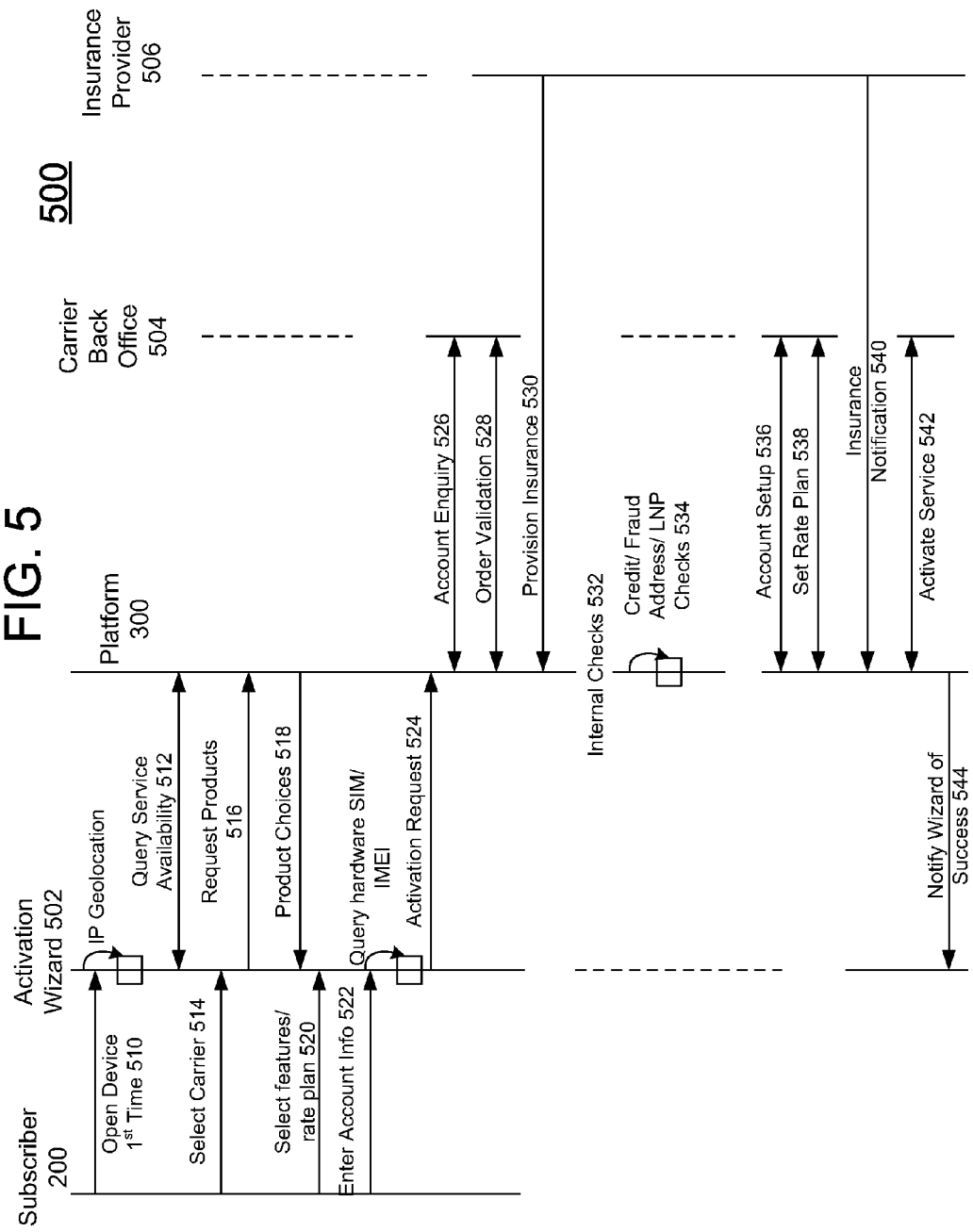
FIG. 5 is a sequence of communication steps among various entities within a communication system for activating a subscriber device in accordance with an embodiment of the present invention.

FIG. 5 is a sequence 500 of communication steps among various entities within a communication system for activating a subscriber device 200 in accordance with an embodiment of the present invention.

At step 510, the subscriber device 200 may be opened, or powered on. This step prompts the activation wizard 502 to conduct IP geo-location of the device 200. At step 512, wizard 502 may conduct a query 512 of platform 300 to determine service availability. Upon receiving a result from the query 512, subscriber device 200 may select (514) a carrier 504 (carrier 504 may generally correspond to one of servers 402-n of FIG. 1), and request (516) that a list of communication products be made available for evaluation and selection. At step 518, platform 300 may return a list of product choices to subscriber device 200. Thereafter, subscriber device 200 may select desired communication services and features and a rate plan (520). Subscriber device 200 may also provide account information (522) to the wizard 502. After step 522, wizard 502 may query the subscriber device 200 hardware to get SIM/IMEI information therefor. Thereafter, activation wizard 502 may issue an activation request (524) to platform 300.

Having received sufficient information from the subscriber device 200, platform 300 then preferably interacts with carrier back office 504 and insurance 506 provider 506 to complete the activation process, as described in the following steps.

Platform 300 may conduct an account enquiry (526) of Carrier 504. Thereafter, an order validation step (528) may be conducted between platform 300 and carrier 504. At step 530, insurance provider 506 may provide insurance to platform 300.

Internal checks (532) may then be conducted by platform 300. Thereafter, additional checks 534 may be conducted, which may include but are not limited to: credit check; fraud check; the availability of Local Number Portability (LNP); and/or address validation. Account setup (536) may be initiated between platform 300 and carrier 504. A rate plan may then be set (538). An insurance notification (540) may then be transmitted from insurance provider 506 to platform 300. At step 542, service may be activated for subscriber device 200. Once service is successfully activated, platform 300 may notify (544) software wizard 502 of the completion of successful activation.

Figure 6:
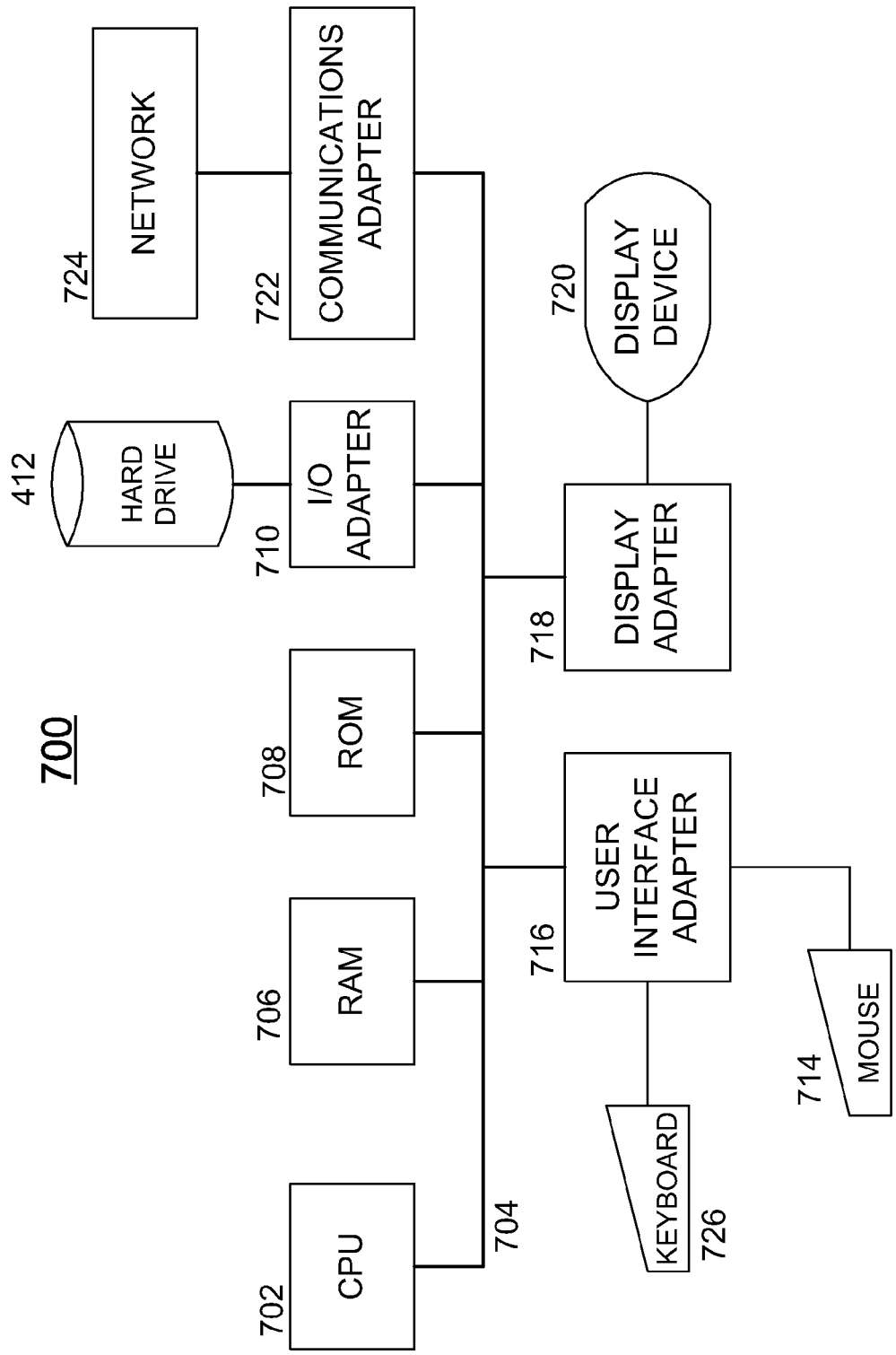
FIG. 6 is an exemplary computer system for use with the present invention.

FIG. 6 is a block diagram of a computing system 700 adaptable for use with one or more embodiments of the present invention. Central processing unit (CPU) 702 may be coupled to bus 704. In addition, bus 704 may be coupled to random access memory (RAM) 706, read only memory (ROM) 708, input/output (I/O) adapter 710, communications adapter 722, user interface adapter 706, and display adapter 718.

In an embodiment, RAM 706 and/or ROM 708 may hold user data, system data, and/or programs. I/O adapter 710 may connect storage devices, such as hard drive 712, a CD-ROM (not shown), or other mass storage device to computing system 700. Communications adapter 722 may couple computing system 700 to a local, wide-area, or global network 724. User interface adapter 716 may couple user input devices, such as keyboard 726, scanner 728 and/or pointing device 714, to computing system 700. Moreover, display adapter 718 may be driven by CPU 702 to control the display on display device 720. CPU 702 may be any general purpose CPU.

It is noted that the methods and apparatus described thus far and/or described later in this document may be achieved utilizing any of the known technologies, such as standard digital circuitry, analog circuitry, any of the known processors that are operable to execute software and/or firmware programs, programmable digital devices or systems, programmable array logic devices, or any combination of the above. One or more embodiments of the invention may also be embodied in a software program for storage in a suitable storage medium and execution by a processing unit.

When a new device is to be provisioned on the network, an order may be placed to the convergence platform in one of plural states. A generic command, such as "Provision a New Device on X network" may be sent, and the convergence platform can translate that command into the appropriate interface commands for communicating with the relevant CSP. Alternatively, the command from the requester may be in the form of a set of plural specific provisioning commands which are in a generic language. In this manner, the same language may be used to provision new devices on any one of plural CSPs.

In still a third methodology, the requester may issue individual commands in the language of the particular CSP on which the device is to be provisioned. This will allow third parties that already have requester computer systems in place for particular CSP's to continue to use them.

When the convergence platform receives a request to provision a new device, it can examine the initial few commands and make a determination as to whether it must translate the one or more generic commands into a larger number of individual commands, and whether any specific individual commands are in a generic language and may require translation into a specific language of a particular CSP. Alternatively, if all the commands are in the specific language of the particular CSP on which the device is to be provisioned, the convergence platform may simply pass them through unaltered.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:
1. A method comprising:
transmitting, by a communication convergence platform, a first signal to a first device, wherein the first signal enables a user of the first device to select one or more service providers;
receiving, at the communication convergence platform, a second signal from the first device, wherein the second signal requests that the communication convergence platform transmit a list of communication products to the first device;

transmitting, by the communication convergence platform, a third signal to the first device, wherein the third signal comprises the list of communication products;

receiving, at the communication convergence platform, an activation request from the first device, wherein the activation request identifies a desired communication service and rate plan selected by the user from the list of communication products;

maintaining, at the communication convergence platform, an archive of communication protocols;

identifying, at the communication convergence platform, a first service provider associated with the first device in response to receiving the activation request;

querying, at the communication convergence platform, the archive to determine one or more communication protocols that are compatible with the first service provider;

composing, at the communication convergence platform, a fourth signal, wherein the fourth signal is composed using a first communication protocol in the archive that is determined to be compatible for communicating with the first service provider; and transmitting, by the communication convergence platform, the fourth signal to the first service provider, wherein the fourth signal is to activate the first device.

2. The method of claim 1 further comprising:
receiving, at the communication convergence platform, a fifth signal from the first device, wherein the fifth signal is a query for the communication convergence platform to determine service availability, and wherein the step of determining the service availability is based on an Internet Protocol (IP) geo-location of the first device.

3. The method of claim 1 further comprising:
receiving, at the communication convergence platform, a fifth signal from the first service provider, wherein the fifth signal indicates that the desired service selected by the user of the first device has been activated; and
transmitting, by the communication convergence platform, a sixth signal to the first device, wherein the sixth signal notifies the user of the first device that the activation is successful.

4. The method of claim 1, wherein an activation wizard of the first device is configured to receive account information from the user of the first device;
wherein the activation wizard is also configured to query the first device to obtain Subscriber Identity Module (SIM) or International Mobile Equipment Identify (IMEI) information; and
wherein the activation wizard is also configured to transmit the activation request to the communication convergence platform for activating the first device.

5. The method of claim 1, wherein the communication convergence platform is configured with an Extensible Markup Language (XML)-based Application Program Interface (API); and
wherein the XML-based API of the communication convergence platform enables the user to activate one or more services for the first device using one or more activation steps that are independent of a network in which the first device will operate on.

6. The method of claim 1, wherein the communication convergence platform comprises a fallout management system; and
wherein the fallout management system is configured to direct data indicative of one or more subscriber transaction problems to selected data queues to await human intervention for debugging.

7. The method of claim 1, wherein the communication convergence platform provides a front-end connection for the first device to perform at least one of the following tasks: place one or more orders; check for service availability; initiate one or more credit checks; initiate activation of the first device; re-activate the first device; and manage the first device.

8. The method of claim 1 further comprising:
establishing, at the communication convergence platform, a connection with the first service provider in response to receiving the activation request from the first device; and
performing, at the communication convergence platform, a credit check of the user of the first device, wherein the credit check is to ensure that the user has a credit rating that satisfies a credit rating criteria implemented by the first service provider.

9. The method of claim 1, wherein the communication convergence platform comprises a gateway manager module;
wherein the gateway manager module is configured to verify an available inventory level upon receiving an inventory check request from the first device; and
wherein the step of verifying is performed by the gateway manager module before transmitting an order request to the first service provider so as to inform the user of the first device of potential out-of-stock conditions.

10. The method of claim 1, wherein the communication convergence platform comprises a gateway manager module;
wherein the gateway manager module is configured to determine a service availability of the first service provider for a geographic region; and
wherein the step of determining the service availability is performed by the gateway manager module in response to receiving a coverage check request from the first device.

11. The method of claim 1, wherein the communication convergence platform comprises a workflow manager module;
wherein the workflow manager module is configured to implement one or more rules for identifying how an order derived from the activation request should be managed through the communication convergence platform; and
wherein the one or more rules comprise at least one of: number portability; fraud velocity; service availability; credit check; inventory check; address normalization and validation; and order qualification.

12. The method of claim 1, wherein the communication convergence platform comprises a visibility manager module; and
wherein reports that track activities of the first service provider and other service providers are made available to the user of the first device via the visibility manager module under password protection.

13. The method of claim 1, wherein the user operates a kiosk to activate the first device.

14. A method comprising:
maintaining, at a communication convergence platform, an archive of communication protocols, wherein the archive enables a user to activate one or more services for the first device using one or more activation steps that are independent of a network in which the first device will operate on, and wherein the activation steps comprise;

(i) transmitting, by the communication convergence platform, a first signal to the first device, wherein the first signal enables the user to select one or more service providers;
(ii) receiving, at the communication convergence platform, a second signal from the first device, wherein the second signal requests that the communication convergence platform transmit a list of communication products to the first device;
(iii) transmitting, by the communication convergence platform, a third signal to the first device, wherein the third signal comprises the list;
(iv) receiving, at the communication convergence platform, an activation request from the first device, wherein the activation request identifies a desired communication service and rate plan selected by the user from the list;
(v) identifying, at the communication convergence platform, a first service provider associated with the first device in response to receiving the activation request;
(vi) querying, at the communication convergence platform, the archive to determine one or more communication protocols that are compatible with the first service provider;
(vii) composing, at the communication convergence platform, a fourth signal, wherein the fourth signal is composed using a first communication protocol in the archive that is determined to be compatible for communicating with the first service provider; and
(viii) transmitting, by the communication convergence platform, the fourth signal to the first service provider, wherein the fourth signal is to activate the first device.

15. A communication convergence platform, wherein the communication convergence platform comprises:
(i) a fallout management system configured to direct data indicative of one or more subscriber transaction problems to selected data queues to await human intervention for debugging;
(ii) a gateway manager module configured to determine a service availability of one or more service providers for a geographic region in response to receiving a coverage check request from a device;
(iii) a workflow manager module configured to implement one or more rules for identifying how an activation request should be managed; and
(iv) a visibility manager module, wherein reports that track activities of the one or more service providers are made available to a user of the device via the visibility manager module under password protection;
wherein the communication convergence platform is configured to transmit a first signal to a first device to enable a user to select one or more service providers;
wherein the communication convergence platform is configured to receive a second signal from the first device to obtain a list of available communication products;
wherein the communication convergence platform is configured to transmit a third signal to the first device that comprises the list; and
wherein the communication convergence platform is configured to receive an activation request from the first device that identifies a desired communication service and rate plan selected by the user from the list.

\* \* \* \* \*